US 8,337,581 B2

(12) United States Patent
Dejaune et al.

(10) Patent No.: US 8,337,581 B2
(45) Date of Patent: Dec. 25, 2012

(54) OIL-SEPARATOR ROTOR FOR A TURBOMACHINE

(75) Inventors: Claude Gerard Rene Dejaune, Boissise la Betrand (FR); Gael Loro, Combs la Ville (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 13/125,737

(22) PCT Filed: Sep. 29, 2009

(86) PCT No.: PCT/FR2009/001163
§ 371 (c)(1),
(2), (4) Date: Jun. 24, 2011

(87) PCT Pub. No.: WO2010/046551
PCT Pub. Date: Apr. 29, 2010

(65) Prior Publication Data
US 2011/0258977 A1 Oct. 27, 2011

(30) Foreign Application Priority Data
Oct. 24, 2008 (FR) ..................................... 08 05934

(51) Int. Cl.
*B01D 46/18* (2006.01)
(52) U.S. Cl. ................ 55/406; 55/400; 55/401; 55/408; 55/409; 55/385.1; 96/188; 96/189

(58) Field of Classification Search .................... 55/400, 55/401, 406, 408, 409, 385.1; 96/188, 189
See application file for complete search history.

(56) References Cited

U.S. PATENT DOCUMENTS

| 4,049,401 A | 9/1977 | Smith |
| 5,776,229 A | 7/1998 | Blanes et al. |
| 6,033,450 A | 3/2000 | Krul et al. |
| 6,398,833 B1 | 6/2002 | Santerre et al. |

FOREIGN PATENT DOCUMENTS

| EP | 0 780 546 | 6/1997 |
| FR | 2 299 898 | 9/1976 |
| WO | 02 36240 | 5/2002 |

OTHER PUBLICATIONS

International Search Report issued Dec. 21, 2009 in PCT/FR09/001163 filed Sep. 29, 2009.

*Primary Examiner* — Jason M Green
*Assistant Examiner* — Dung H Bui
(74) *Attorney, Agent, or Firm* — Oblon, Spivak, McClelland, Maier & Neustadt, L.L.P.

(57) ABSTRACT

An oil separator rotor for a turbomachine, including a tubular hub that includes an external annular flange and an annular cover which, in cross section, is substantially L-shaped and mounted around the hub. The hub flange includes, at its external periphery, a mechanism to radially retain the free end of the cylindrical wall of the cover, so as to center this end and prevent it from deforming in the radially outwards direction under the effect of centrifugal force.

10 Claims, 3 Drawing Sheets

OIL-SEPARATOR ROTOR FOR A TURBOMACHINE

BACKGROUND OF THE INVENTION

1. Field of the Invention

The present invention relates to an oil-separator rotor for a turbomachine such as an airplane turboprop or turbojet.

2. Description of the Related Art

An oil-separator rotor of that type comprises a tubular hub defining an internal axial duct for passing fluid and including an outer annular collar, together with an annular cap of substantially L-shaped section that is mounted around the hub. The cap has a radial wall that is parallel to the collar of the hub and that is connected at its outer periphery to one of the axial ends of a cylindrical wall that extends axially as far as the outer periphery of the collar.

The cap co-operates with the collar of the hub to define an annular chamber that is in fluid flow communication with the internal passage of the hub via radial slots therein. Means for depositing oil by centrifuging are housed in the chamber.

The oil-separator rotor is mounted on an element of the rotor of the turbomachine, in general at the downstream end of a degassing tube, and it serves to separate the oil and the air of an air/oil mixture, said oil then being recovered by suitable means in order to be recycled. The air/oil mixture is in the form of an oil mist, i.e. air having droplets of oil dispersed therein in suspension. Oil separation is obtained in particular by centrifuging the oil under the effect of the oil-separator rotor rotating.

In one particular configuration, while the turbomachine is in operation, the air/oil mixture flows inside the degassing tube and penetrates into the internal passage of the hub of the oil-separate rotor via its upstream end. Under the effect of centrifugal forces, the droplets of oil are urged radially outwards. When they reach the radial slots in the hub, they pass through the slots by centrifuging and then penetrate into the annular chamber of the oil-separator rotor, in which they are forced to become deposited on the oil deposition means housed in the annular chamber. The oil is then evacuated radially outwards through the openings in the cylindrical wall of the cap, and the air separated from the oil leaves via the downstream end of the internal passage of the hub.

A known oil-separator rotor has its cap fastened to the collar of the hub by screws that pass axially through the annular chamber housing the oil deposition means. Those screws pass through orifices in the radial wall of the cap and in the collar of the hub, and they are surrounded by spacers that isolate them from the oil deposition means. The cap fastener screws then extend through the annular space of the chamber occupied by the oil deposition means, thereby occupying said space and possibly disturbing oil recovery, since it is possible for the oil deposition means to be flattened to a greater or lesser extent by the screws.

Furthermore, the free end of the cylindrical wall of the cap bears radially inwards against the outer periphery of the collar. In this configuration, this free end of the cap forms means for centering the collar of the hub. In operation, under the effect of centrifugal forces, the free end of the cylindrical wall of the cap tends to become oval, by deforming locally outwards. Under such circumstances, there is a risk of uncontrolled oil leakage to the outside of the chamber.

An oil-separator rotor is also known in which the cap is fastened on the hub as an interference fit, the inner periphery of the radial wall of the cap clamping onto the hub. In order to avoid the above-mentioned problems associated with the downstream end of the cap ovalizing, said end is welded to the outer periphery of the collar via at least three weld beads that are regularly distributed around the longitudinal axis of the rotor.

Nevertheless, under such circumstances, the cap is fastened on the hub in such a manner that it is difficult to remove. Furthermore, it has been found that the weld beads are not a good solution to the above-mentioned problem, since they are subjected to high levels of stress concentration that cause cracking to appear in those beads. There is then a major risk of the cap becoming disengaged from the hub, with the interference fit of the cap possibly being found insufficient for retaining said part on the hub of the oil-separator rotor.

The cracked weld beads may be repaired by a new welding operation. However, the weld zones of the cap and of the collar are subjected to high levels of thermal stress on each welding operation, and that may shorten their lifetime.

BRIEF SUMMARY OF THE INVENTION

A particular object of the invention is to provide a solution to at least a portion of the above-mentioned problems of the prior art, which solution is simple, inexpensive, and effective.

To this end, the invention provides a turbomachine oil-separator rotor comprising a tubular hub and an annular cap, the tubular hub defining an internal axial passage for fluid and including an outer annular collar, and the annular cap being mounted around the hub, the cap comprising both a radial wall and a cylindrical wall that co-operates with the annular collar of the hub to define an annular chamber that communicates with the internal passage of the hub and that houses means for depositing oil by centrifuging, the rotor being characterized in that the annular collar of the hub includes at its outer periphery means for retaining the end of the cylindrical wall of the hub radially so as to center said end and prevent it from deforming radially outwards under the effect of centrifugal forces, and in that the inner peripheral portion of the radial wall of the cap bears axially thereagainst and is fastened by nut-and-bolt type means to the hub at a distance from the collar.

According to the invention, the collar of the hub holds the end of the cylindrical wall of the cap mechanically, unlike the prior art technique where the end of the cylindrical wall of the cap is fastened externally on the collar of the hub.

The retaining means of the collar extend around the end of the cylindrical wall of the cap and prevent it from deforming radially outwards under the effect of centrifugal forces. The end of the cylindrical wall of the cap bears radially outwards against the retaining means, and it does so locally in zones that are distributed around the longitudinal axis of the oil-separator rotor, or else it does so continuously over a circumference that is centered on said axis.

The cap is fastened releasably to the hub, thereby making it easier to dismantle, e.g. for the purpose of performing a cleaning operation or for the purpose of replacing the oil deposition means of the oil-separator rotor.

The fastener means are situated at the inner peripheral portion of the cap and are therefore not situated in the radially outer annular space of the chamber that is occupied by the oil deposition means. These fastener means connect the cap directly to the tubular body of the hub and not to its collar, and therefore they do not pass axially through the chamber and they do not disturb oil recovery.

The outer periphery of the collar of the hub may form a cylindrical rim extending axially towards the cap around the end of the cylindrical wall of the cap. This cylindrical rim extends radially outside the end of the cylindrical wall of the cap, and it includes annular means for bearing radially on said end.

In a variant or as an additional characteristic, the outer periphery of the collar of the hub includes circumferentially-extending tongues projecting axially towards the cap around the end of the cylindrical wall of the cap. These tongues are situated radially outside the end of the cylindrical wall of the cap and each of them includes means for bearing radially on said end.

Preferably, these tongues are regularly distributed around the longitudinal axis of the oil-separator rotor. Each of these tongues is in alignment with a longitudinal strip of material of the cylindrical wall of the cap, the strips of material of the cap defining oil outlet openings between one another. The number of these tongues is preferably equal to the number of the above-mentioned strips of material, and by way of example this number is six.

The inner peripheral portion of the radial wall of the cap may form means for bearing axially against an outer annular flange or outer radial tabs of the hub, said flange or said tabs including axial orifices in alignment with the orifices in the radial wall of the cap in order to pass cap fastener screws.

The axial bearing means of the cap to make it possible to block the cap against moving axially in one direction. The cylindrical wall of the cap may also include at its downstream end means for bearing axially in the same direction on the outer periphery of the collar of the hub. The cap is prevented from moving axially in the opposite direction by the above-mentioned fastener means.

Preferably, the nut-and-bolt type fastener means are three in number and are regularly distributed around the longitudinal axis of the rotor. They are therefore relatively few in number so as to limit their weight.

The fastener means may form nuts that are crimped in the orifices of the flange or of the tabs of the hub and that co-operate with bolts that are engaged axially from the outside of the chamber into the orifices in the cap.

The radial wall of the cap may form a cylindrical rim at its inner periphery for centering the cap on the hub.

The invention also provides a turbomachine, such as an airplane turboprop or turbojet, the turbomachine being characterized in that it includes at least one oil-separator rotor of the above-specified type.

BRIEF DESCRIPTION OF THE DRAWINGS

The invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
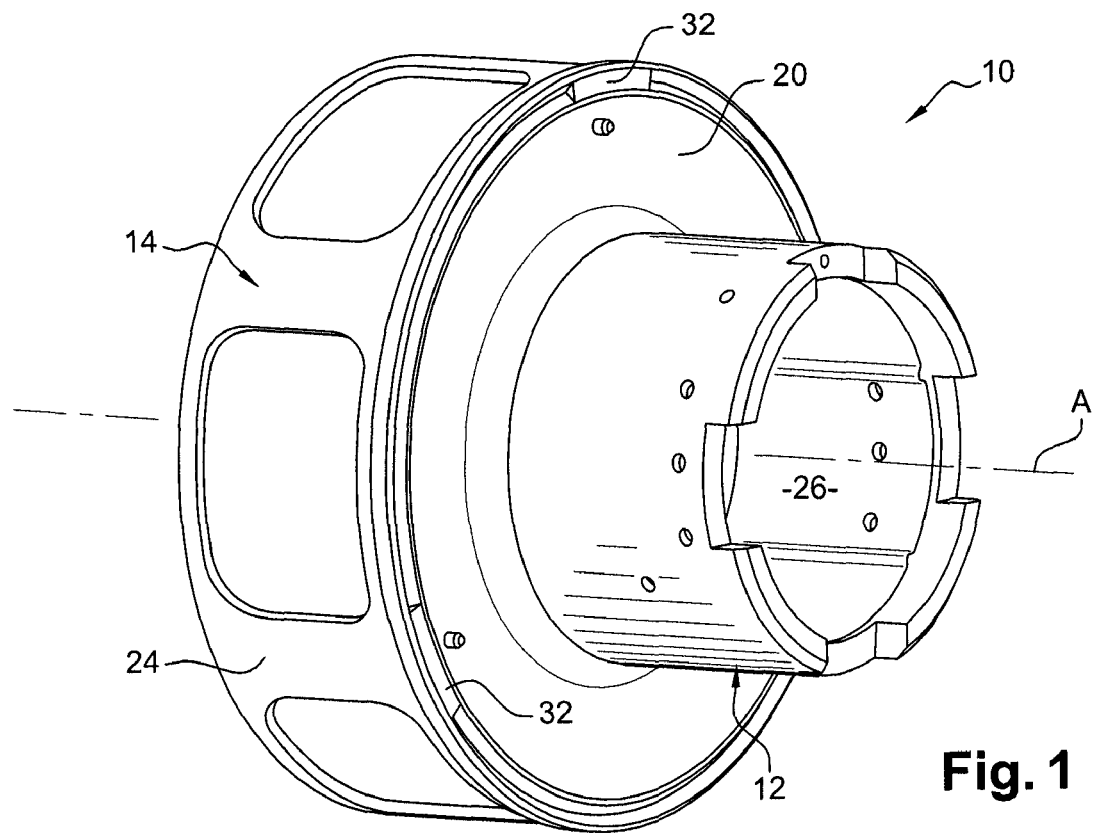
FIG. 1 is a diagrammatic perspective view of a prior art oil-separator rotor for a turbomachine, seen from the side and from upstream.
Figure 2:
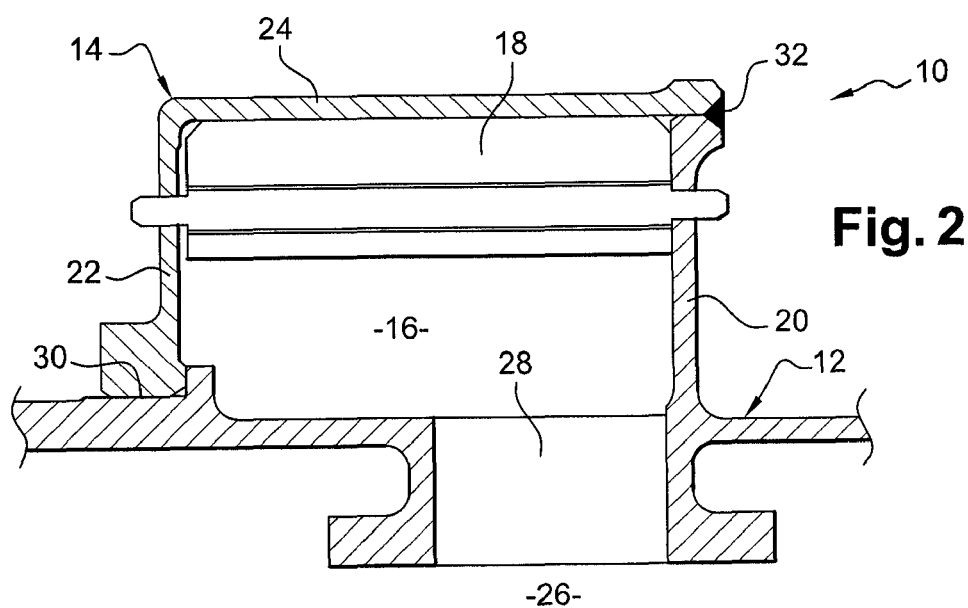
FIG. 2 is a diagrammatic half-view in axial section of the FIG. 1 oil-separator rotor.
Figure 3:
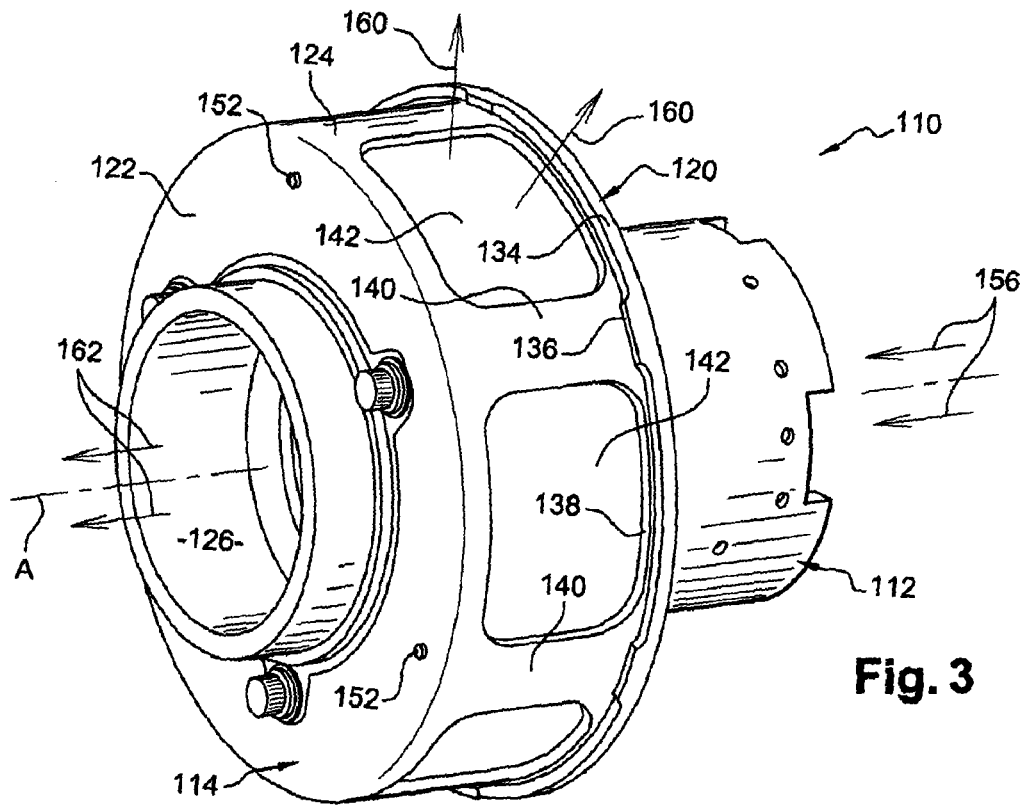
FIG. 3 is a diagrammatic perspective view of a turbomachine oil-separator rotor of the invention, seen from the side and from downstream.
Figure 4:
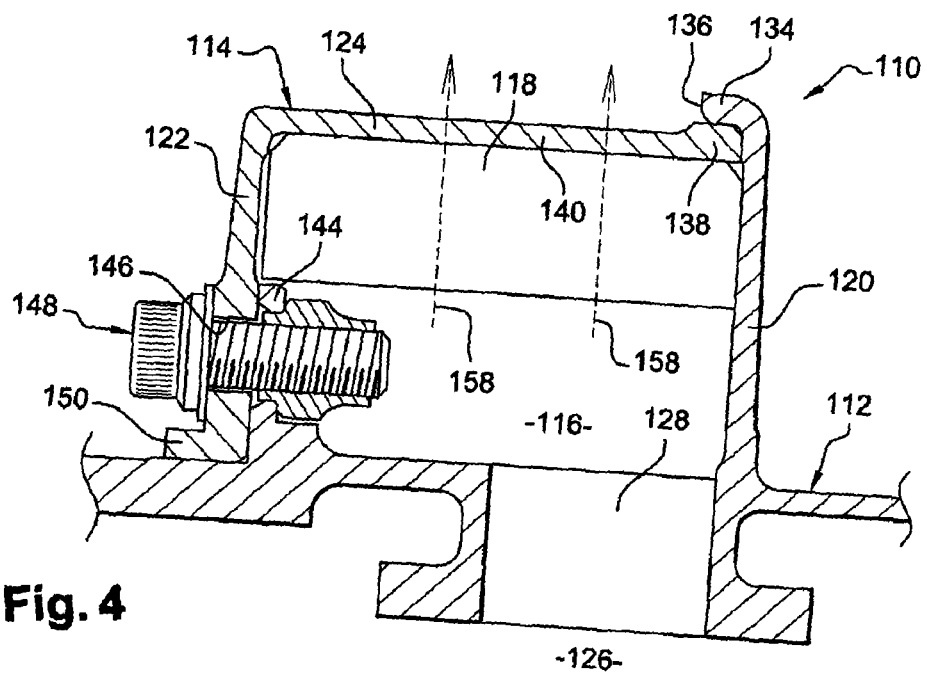
FIG. 4 is a diagrammatic half-view in axial section of the FIG. 3 oil-separator rotor.
Figure 5:
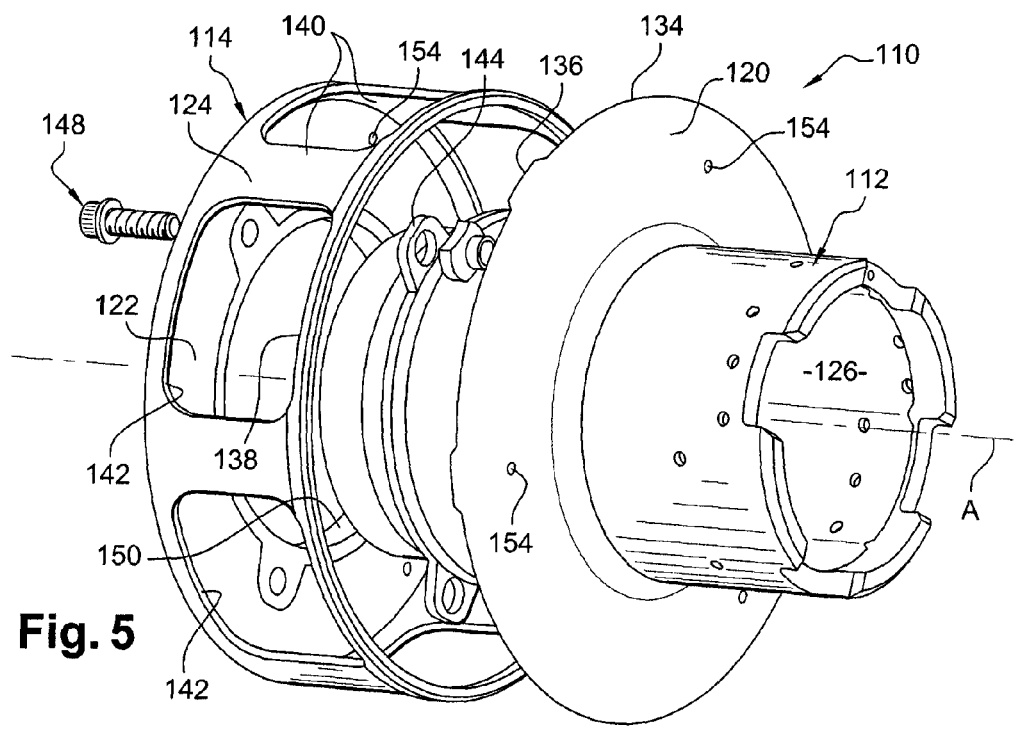
FIG. 5 is an exploded diagrammatic view in perspective showing the FIG. 3 oil-separator rotor, seen from the side and from upstream.
Figure 6:
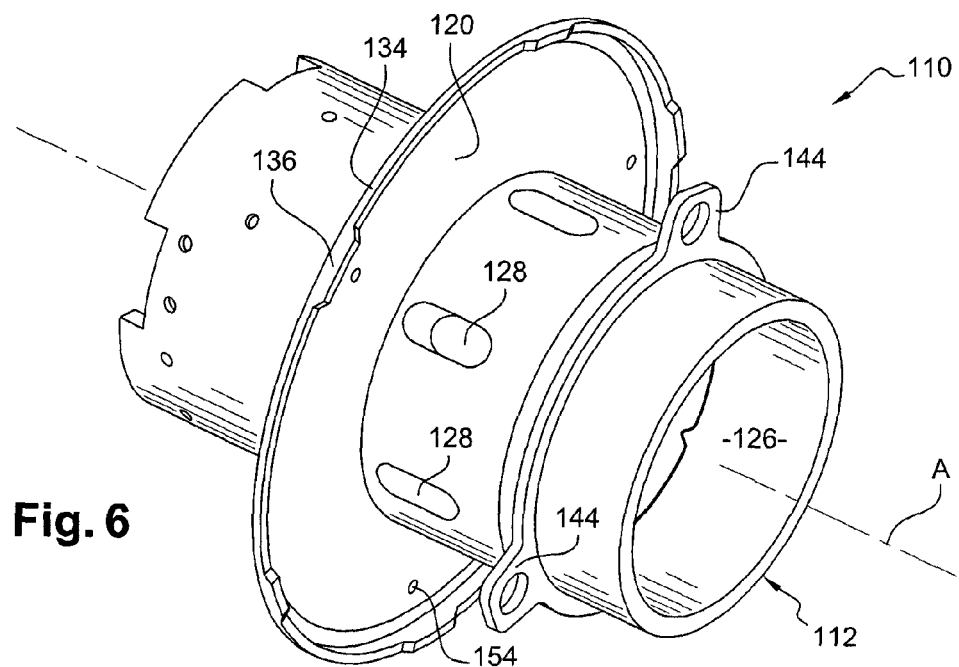
FIG. 6 is a diagrammatic perspective view of the hub of the FIG. 3 oil-separator rotor, seen from the side and from downstream.

Reference is made initially to FIGS. 1 and 2, which show a prior art turbomachine oil-separator rotor 10, said oil-separator rotor 10 essentially comprising a tubular hub 12 defining an internal axial passage 26 that is fed with an air/oil mixture, and an annular cap 14 that is mounted around the hub and that co-operates therewith to define an annular chamber 16 for housing means 18 that deposit oil by centrifuging.

The hub 12 has an annular collar 20 extending substantially radially outwards from the longitudinal axis A of the hub, said axis A coinciding with the axis of rotation of the oil-separator rotor 10.

The collar 20 is situated at a distance from the axial ends of the hub, for example it is situated substantially in the middle of the hub.

The cap 14 has a substantially L-shaped section, and it comprises a radial wall 22 connected at its outer periphery to one of the axial ends of a cylindrical wall 24.

The cap 14 is mounted around the hub 12 so that the inside periphery of the radial wall 22 bears against the body of the hub and extends parallel to and at a distance from the collar 20 of the hub, and so that the cylindrical wall 24 of the hub bears radially inwards against the outer periphery of the collar 20.

The cap 14 co-operates with the collar 20 to define the above-mentioned annular chamber 16 that is in fluid flow communication with the internal passage 26 in the hub via radial slots 28 formed in the body of the hub 12.

The cap 14 is fastened on the hub 12 by an interference fit and by welding. The cap 14 forms an interference fit at 30 via the inner periphery of its radial wall 22 on the body of the hub, and it is fastened to the collar 20 via weld beads 32 between the free end of its cylindrical wall 24 and the outer periphery of the collar 20.

This oil-separator rotor 10 presents the drawbacks described above, and in particular: its cap 14 is not removable; and cracking may appear in the weld beads 32, since they are subjected to high levels of stress in operation as a result of centrifugal forces.

The invention serves to remedy those problems by means for retaining the free end of the cylindrical wall of the cap, which means are carried by the collar of the hub, and by releasable fastener means for fastening the cap to the hub, which releasable means do not disturb oil recovery.

In the embodiment shown in FIGS. 3 to 6, elements described above with reference to FIGS. 1 and 2 are given the same references plus one hundred.

The collar 120 of the hub 112 differs from the collar of the hub 12 in that it includes a cylindrical rim 134 at its outer periphery, which rim extends towards the cap 114. Tongues 136 that extend circumferentially also project axially towards the cap 114 from the free end of the rim 134.

These tongues 136 are regularly distributed around the axis of rotation A of the rotor 110 and there are six of them in the example shown.

The rim 134 and the tongues 136 of the collar 120 form means for centering the free end of the cylindrical wall 124 of the cap 114 and for holding said end against moving radially outwards.

The rim 134 and/or the tongues 136 include means for bearing radially inwards against the free end of the cylindrical wall 124 of the cap 114.

In the example shown, the downstream end portion of the cylindrical wall 124 of the cap is formed by a ring 138 that is connected to the opposite end portion of the wall 124 by longitudinal strips of material 140 that extend parallel to one another and that are regularly distributed around the axis A.

These strips of material 140 define between them radial openings 142 through which oil escapes, as explained in greater detail below. The cap 114 is mounted on the hub 112 so that each tongue 136 is in alignment with a strip of material 140.

The cap 114 is fastened to the hub 112 via the inner peripheral portion of its radial wall 122. The inner peripheral portion of the radial wall 122 bears axially against tabs 144 that extend radially outwards from an outer annular rim of the hub.

These tabs 144 are at an axial distance from the collar 120, which distance corresponds substantially to the length or axial dimension of the cylindrical wall 124 of the cap. Through radial slots 128 for passing oil by centrifuging are formed in the wall of the hub body between the collar 120 and the tabs 144.

The radial wall 122 includes axial orifices 146 that are in alignment with orifices in the tabs 144 for passing releasable fastener means, which means are constituted herein by nut-and-bolt type means 148.

The number of these means 148 is equal to the number of fastener tabs 144, which is equal to three in the example shown. These means 148 are regularly distributed around the axis A in order to limit the formation of any unbalance in operation.

In the example shown, each means 148 comprises a bolt and a nut crimped in the orifice in the tab 144. The nut is housed inside the chamber 116 and it is located radially inside the annular space of the chamber that is occupied by the oil deposition means 118.

Each screw is engaged axially in the corresponding orifice 146 of the cap 114 and is then screwed into the nut by means of a suitable tool that is operated from outside the chamber 116.

The nut is prevented from turning about its own axis by shape co-operation with the above-mentioned outer cylindrical rim of the hub 112.

The radial wall 122 of the cap also includes a cylindrical rim 150 at its inner periphery, which rim is to co-operate with the outer cylindrical surface of the body of the hub 112 in order to center the wall 122 of the cap.

The oil deposition means 118 occupy a radially outer annular portion of the chamber 116. By way of example, they comprise a sectorized annular cartridge of the honeycomb type. In the example shown, the cells in the honeycomb extend radially relative to the axis A so as to allow oil to pass from the chamber 116 to the openings 142 in the cylindrical wall 124 of the cap, under the effect of centrifugal forces. Each sector of the cartridge includes assembly fingers 152 at its axial ends, which fingers are engaged in holes 154 in the collar 120 and in the radial wall 122 of the cap, respectively.

The oil-separator rotor 110 of the invention may be assembled as follows: the cartridge sectors are mounted inside the cap 114 so that their fingers 152 are engaged in the holes 154 of the radial wall 122 of the cap. The cap 114 is axially aligned with the hub 112, and the cap and the hub are secured angularly relative to each other so that the orifices 146 of the cap are in axial alignment with the orifices in the tabs 144 of the hub. The cap 114 is then moved axially towards the hub until it comes to bear via its radial wall 122 against the tabs 144 and via the free end of its cylindrical wall against the collar 120, with the cylindrical rim 134 of the collar bearing radially inwards against the free end of the wall 124 of the cap.

In this position, those fingers 152 of the cartridge sectors that are situated remote from the tabs are engaged in the corresponding holes 154 in the collar 120. The bolts of the fastener means 148 are then screwed into the crimped nuts in order to lock the assembly together.

This oil-separator rotor 110 is particularly, but not exclusively, adapted for being fastened to the downstream end of a degassing tube of a turbomachine such as an airplane turboprop or turbojet. Under such circumstances, the oil-separator rotor 110 operates as follows: the degassing tube serves to convey a mixture of air and oil to the oil-separator rotor. Under the effect of centrifugal forces, the oil droplets in the mixture are urged outwards. The air/oil mixture penetrates into the internal passage 126 of the oil-separator rotor via its upstream end, i.e. the end of the hub 112 that is on the side of the collar 120 opposite from its side on which the cap 114 is located (arrow 156 in FIG. 3). When the oil droplets reach the radial slots 128 in the hub, they are ejected radially outwards through the slots by centrifuging and they enter into the annular chamber 116. These oil droplets then penetrate into the cells of the honeycomb cartridge sectors and become deposited on the walls of these cells. They are conveyed radially outwards under the effect of centrifugal forces (arrow 158 in FIG. 4). When the droplets reach the outer periphery of the cartridge 118 they are ejected outwards through the openings 142 in the wall 124 of the cap (arrow 160 in FIG. 3) and they are recovered by an oil collector of the turbomachine. The air separated from its oil flows inside the passage 126 of the oil-separator rotor and leaves via its downstream end (arrow 162).

In the above-described example, the oil-separator rotor 110 is fed with an air/oil mixture via one end of the internal passage 126 of the hub, and the oil droplets are recovered by centrifuging in the chamber 116 and they then pass radially towards the outside through the oil deposition means 118 and the openings 142 in the cap 114. This type of oil-separator rotor is said to be radial in particular because the flow of oil takes place in a radial direction through the oil deposition means.

Nevertheless, the invention is not limited to this type of oil-separator rotor and it may also be applied to an axial oil-separator rotor, as described for example in document FR-A1-2 742 804 in the name of the Applicant. In an axial oil-separator rotor, oil flows in the chamber in an axial direction through the oil deposition means. That oil-separator rotor may be fed with an air/oil mixture via orifices in the radial wall of the cap. At the outlet from the deposition means, the oil may be expelled radially outwards through openings in the cylindrical wall of the cap, and the air separated from the oil may pass through the slots in the hub and then flow into the inside of the internal passage of the hub.

The invention claimed is:
1. A turbomachine oil-separator rotor comprising:
a tubular hub; and
an annular cap,
the tubular hub defining an internal axial passage for fluid and including an outer annular collar, and the annular cap being mounted around the tubular hub, the annular cap comprising both a radial wall and a cylindrical wall that co-operates with the outer annular collar of the tubular hub to define an annular chamber that communicates with the internal passage of the tubular hub and that houses means for depositing oil by centrifuging, wherein the outer annular collar of the tubular hub includes at its outer periphery means for retaining an end of the cylindrical wall of the annular cap radially so as to center the end and prevent the end from deforming radially outwards under effect of centrifugal forces, and wherein an inner peripheral portion of the radial wall of the annular cap bears axially thereagainst and is fastened by nut-and-bolt type means to the tubular hub at a distance from the outer annular collar.

2. A turbomachine oil-separator rotor according to claim 1, wherein the outer periphery of the outer annular collar of the tubular hub includes a cylindrical rim extending axially towards the annular cap around the end of the cylindrical wall of the annular cap.

3. A turbomachine oil-separator rotor according to claim 1, wherein the outer periphery of the outer annular collar of the tubular hub includes circumferentially-extending tongues projecting axially towards the annular cap around the end of the cylindrical wall of the annular cap.

4. A turbomachine oil-separator rotor according to claim 3, wherein the circumferentially-extending tongues are regularly distributed around the longitudinal axis of the oil-separator rotor.

5. A turbomachine oil-separator rotor according to claim 3, wherein each circumferentially-extending tongue is in alignment with a longitudinal strip of material of the cylindrical wall of the annular cap, the strips of material of the annular cap defining oil outlet openings between one another.

6. A turbomachine oil-separator rotor according to claim 1, wherein the inner peripheral portion of the radial wall of the annular cap includes means for bearing axially against an outer annular flange or outer radial tabs of the tubular hub, the flange or the tabs including axial orifices in alignment with the orifices in the radial wall of the annular cap to pass cap fastener screws.

7. A turbomachine oil-separator rotor according to claim 1, wherein the nut-and-bolt type means are three in number and are regularly distributed around the longitudinal axis of the oil-separator rotor.

8. A turbomachine oil-separator rotor according to claim 1, wherein the nut-and-bolt type means comprise nuts that are crimped in orifices of a flange or of tabs of the tubular hub and that co-operate with bolts that are engaged axially from the outside of the annular chamber into orifices in the annular cap.

9. A turbomachine oil-separator rotor according to claim 1, wherein the radial wall of the annular cap includes a cylindrical rim at its inner periphery for centering the annular cap on the tubular hub.

10. A turbomachine, an airplane turbojet, or a turboprop, comprising at least one turbomachine oil-separator rotor according to claim 1.

* * * * *

UNITED STATES PATENT AND TRADEMARK OFFICE
CERTIFICATE OF CORRECTION

| | | |
|---|---|---|
| PATENT NO. | : 8,337,581 B2 | Page 1 of 1 |
| APPLICATION NO. | : 13/125737 | |
| DATED | : December 25, 2012 | |
| INVENTOR(S) | : Claude Gerard Rene Dejaune et al. | |

It is certified that error appears in the above-identified patent and that said Letters Patent is hereby corrected as shown below:

On the title page, Item (75), please correct Inventor Claude Gerard Rene Dejaune's address of "Boissise la Betrand (FR)" to --Boissise la Bertrand (FR)--.

Claim 6, line 8: "the orifices in the radial wall of the annular cap to pass cap" should read as --orifices in the radial wall of the annular cap to pass cap--.

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,337,581 B2 | Page 1 of 1 |
| APPLICATION NO. | : 13/125737 | |
| DATED | : December 25, 2012 | |
| INVENTOR(S) | : Claude Gerard Rene Dejaune et al. | |

It is certified that error appears in the above-identified patent and that said Letters Patent is hereby corrected as shown below:

On the title page, Item (75), please correct Inventor Claude Gerard Rene Dejaune's address of "Boissise la Betrand (FR)" to --Boissise la Bertrand (FR)--.

In the Claims:

Column 8, line 8 (Claim 6, line 6) "the orifices in the radial wall of the annular cap to pass cap" should read as --orifices in the radial wall of the annular cap to pass cap--.

This certificate supersedes the Certificate of Correction issued April 2, 2013.

Signed and Sealed this
Twenty-third Day of April, 2013

Teresa Stanek Rea
*Acting Director of the United States Patent and Trademark Office*